United States Patent
Jones et al.

(10) Patent No.: US 10,820,275 B2
(45) Date of Patent: Oct. 27, 2020

(54) DATA COMMUNICATION DEVICE AND METHOD

(71) Applicant: Mitsubishi Australia Limited, Mt. Waverley, Victoria (AU)

(72) Inventors: Lee Jones, Mt. Waveriey (AU); Sue Lee, Mt. Waveriey (AU); Sanjay Savur, Mt. Waveriey (AU)

(73) Assignee: Avcatech Pty Ltd, Essendon Fields (AU)

( * ) Notice: Subject to any disclaimer, the term of this patent is extended or adjusted under 35 U.S.C. 154(b) by 0 days.

(21) Appl. No.: 16/125,997

(22) Filed: Sep. 10, 2018

(65) Prior Publication Data

US 2019/0007908 A1   Jan. 3, 2019

Related U.S. Application Data

(63) Continuation of application No. 15/118,527, filed as application No. PCT/AU2014/050215 on Sep. 5, 2014, now abandoned.

(30) Foreign Application Priority Data

Feb. 21, 2014   (AU) ................................ 2014900568

(51) Int. Cl.
*H04W 52/02*   (2009.01)
*H04L 29/06*   (2006.01)

(52) U.S. Cl.
CPC ......... *H04W 52/0277* (2013.01); *H04L 69/28* (2013.01); *H04W 52/0296* (2013.01);
(Continued)

(58) Field of Classification Search
None
See application file for complete search history.

(56) References Cited

U.S. PATENT DOCUMENTS 281,113 A   7/1883   Morris
4,194,143 A *  3/1980   Farkas .................. H05B 41/34
                                                315/205
(Continued)

FOREIGN PATENT DOCUMENTS

| AU | 764740 | 5/2000 |
|---|---|---|
| EP | 1751727 | 3/2010 |
| WO | WO2012/149611 | 11/2012 |

OTHER PUBLICATIONS

Time Slicing (digital broadcasting)—Wikipedia Article [retrieved on Oct. 22, 2014]. Retrieved from the Internet.
(Continued)

*Primary Examiner* — Andrew C Oh
(74) *Attorney, Agent, or Firm* — Barnes & Thornburg LLP; Jeffrey R. Stone

(57) ABSTRACT

The present invention relates to a data communication device and method for recording and transmitting data concerning conditions within or pertaining to a transportation container, such as a controlled environment transportation container. The communication device includes a processor, a memory, a port for receiving the data, a first power source, a communication module operatively coupled to the first power source, and a computer program stored in the memory. The program is operative, when executed on the processor, to store the received data in the memory and to cause the communication module to periodically power on, attempt for a specified time period to establish a network connection, and in the event of a successful connection, communicate data stored in the memory over the network, and to power off. The processor independently operates to switch between sleep and active modes in accordance with a system timer or receipt of data, and to determine whether the communication module is to be activated.

22 Claims, 5 Drawing Sheets

(52) U.S. Cl.
CPC .............. *H04L 69/16* (2013.01); *Y02D 70/00* (2018.01); *Y02D 70/1222* (2018.01); *Y02D 70/1224* (2018.01); *Y02D 70/1262* (2018.01); *Y02D 70/142* (2018.01); *Y02D 70/144* (2018.01); *Y02D 70/162* (2018.01)

(56) References Cited

U.S. PATENT DOCUMENTS

| | | | |
|---|---|---|---|
| 5,373,282 A * | 12/1994 | Carter | B60R 25/102 235/382 |
| 5,636,243 A * | 6/1997 | Tanaka | H04W 56/002 375/219 |
| 5,834,925 A * | 11/1998 | Chesavage | H02J 1/108 323/272 |
| 6,927,688 B2 | 8/2005 | Tice | |
| 7,366,522 B2 | 4/2008 | Thomas | |
| 7,416,726 B2 | 8/2008 | Ravetch | |
| 7,784,707 B2 | 8/2010 | Witty et al. | |
| 8,354,927 B2 | 1/2013 | Breed | |
| 8,416,726 B2 | 4/2013 | Berenberg | |
| 2004/0018817 A1 | 1/2004 | Kanayama et al. | |
| 2004/0194471 A1 | 10/2004 | Rickson | |
| 2005/0046567 A1 | 3/2005 | Mortenson et al. | |
| 2005/0047404 A1 | 3/2005 | Kim | |
| 2008/0043656 A1 | 2/2008 | Yoon | |
| 2008/0123581 A1 | 5/2008 | Wells | |
| 2009/0059827 A1 | 3/2009 | Liu et al. | |
| 2010/0289669 A1 | 11/2010 | Saltzman et al. | |
| 2010/0304672 A1 * | 12/2010 | Lerner | H04W 52/0235 455/41.2 |
| 2011/0022532 A1 | 1/2011 | Kriss | |
| 2011/0128886 A1 | 6/2011 | Husney | |
| 2012/0029853 A1 * | 2/2012 | Baumheinrich | F03D 17/00 702/65 |
| 2012/0203918 A1 | 8/2012 | Berenberg et al. | |
| 2012/0252488 A1 | 10/2012 | Hartmann et al. | |
| 2012/0279382 A1 | 11/2012 | Garrett | |
| 2013/0119954 A1 * | 5/2013 | Lo | G05F 1/10 323/280 |
| 2013/0281113 A1 | 10/2013 | Schlaupitz et al. | |
| 2013/0282928 A1 * | 10/2013 | Winestein | G06F 13/385 710/5 |
| 2013/0329637 A1 * | 12/2013 | Kodali | H04W 76/27 370/328 |
| 2014/0235188 A1 * | 8/2014 | Lee | H01M 10/465 455/127.5 |
| 2014/0274019 A1 | 9/2014 | Batchu | |
| 2015/0006665 A1 * | 1/2015 | Krishnamurthy | G06F 3/0631 709/213 |
| 2015/0022373 A1 | 1/2015 | Bommer | |
| 2015/0046361 A1 * | 2/2015 | Williams | G06Q 10/083 705/330 |

OTHER PUBLICATIONS

International Search Report and Written Opinion issued in related PCT/AU2014/050215 and dated Oct. 24, 2015.
Extended European Search Report, dated Oct. 4, 2017, for PCT Application No. PCT/AU2014/050215, filed Sep. 5, 2014.

* cited by examiner

DATA COMMUNICATION DEVICE AND METHOD

FIELD OF THE INVENTION

The present invention relates to a data communication device and method. More particularly, the present invention is concerned with a data communication device and method for recording and transmitting data concerning conditions pertaining to a transportation container, such as a controlled environment transportation container.

BACKGROUND OF THE INVENTION

Any discussion of documents, acts, materials, devices, articles and the like in this specification is included solely for the purpose of providing a context for the present invention. It is not suggested or represented that any of these matters formed part of the prior art base or were common general knowledge in the field relevant to the present invention as it existed in Australia or elsewhere before the priority date of each claim of this application.

The Applicant's Australian patent specification nos. 764740 and 2012250500 describe apparatus and methods for controlling atmospheric conditions within a refrigerated transportation container used to transport perishable goods such as fresh fruit and vegetables. Atmosphere control is critical in prolonging the storage life of the perishable goods, as atmospheric parameters within the container, such as temperature and atmospheric gas composition, affect the rate of respiration and deterioration of the goods after harvest.

In broad terms, the apparatus functions by using a dedicated controller to periodically monitor the oxygen concentration within a container and, based on a preset oxygen setpoint, to selectively actuate a valve assembly or other means to introduce fresh air into the container in order to increase the amount of oxygen.

At the same time, carbon dioxide is removed from the container at a controlled rate (by way of hydrated lime scrubbers or other removal means) so as to ensure that the carbon dioxide concentration does not exceed a desired level.

The controller thus provides simple and robust accurate maintenance of the gas constituents during the voyage.

Parameters such as oxygen concentration and temperature are measured by suitable sensors that are operatively coupled to a memory in the controller, such as digital data logger, in which the measurements can be stored. Other data associated with the transportation container and/or controlling apparatus (such as valve opening times and durations, etc.) can also be measured and stored by the controller.

The data thus gathered over the course of a voyage can be of great value in applications such as calibrating apparatus parameters (including the periodicity of oxygen monitoring, rate of carbon dioxide removal and valve opening durations) to particular varieties of goods. Typically, for the data to be accessed, it is necessary to make a wired connection to the data logger once the shipping container has reached its destination, and to download the data therefrom. However, in some circumstances, gaining access to the container or its data logger may not be possible, and/or may involve significant cost. If the data logger is not accessed or the apparatus is lost the potentially valuable data is unavailable or irretrievably lost.

This problem of lost data may to some extent be ameliorated by known devices that function to monitor environmental and other parameters and transmit the gathered data to a remote location over radio frequency. Remote monitoring, at least for containers transported by road or rail, via data loggers equipped with wireless communications functionality (eg. a GSM or GPRS modem) is known, allowing remote data acquisition, including active querying by a user.

By way of example, EP 1 751 727 describes a sensor module with a self-contained power supply in the form of a photovoltaic cell and a pair of capacitors, with the cell providing power to the capacitors. Gathered data is transmitted in discrete bursts in a manner such that the period of transmission is significantly shorter than the period between transmissions.

Further, US 2012/0252488 describes a real time tracking and monitoring device for a refrigerated shipping container (or 'reefer') that includes a CPU, security sensor, cellular or satellite modem and an antenna for long range communication with a remote monitoring centre. Power is provided to the device via a rechargeable battery, the operation of which is controlled by a power management controller. The power management controller is configured so as to cause minimum intervention commensurate with providing real time monitoring and tracking, typically by controlling the CPU to remain dormant and periodically awaken to convey gathered data from the sensor.

US 2012/0252488 contains no discussion of the details of the rechargeable battery that powers the tracking and monitoring device. As the skilled reader would appreciate, a large, heavy and relatively expensive battery pack (at least a 1 kg lithium battery) would generally be required to provide real time operation during a sea voyage lasting days or possibly weeks.

SUMMARY OF THE INVENTION

According to a first aspect of the present invention there is provided a data communication device for recording and transmitting data concerning conditions pertaining to a transportation container, the communication device including:

a processor;
a memory;
a port for receiving said data;
a first power source;
a communication module operatively coupled to the first power source; and
a computer program stored in the memory, the program being operative, when executed on the processor to:
store the received data in the memory; and
cause the communication module to periodically:
power on;
attempt for a specified time period to establish a network connection, and in the event of a successful connection, communicate data stored in the memory over the network; and
power off.

In the event of a failure to connect in said specified time period, the program is configured such that the communication module simply powers off without attempting communication of the stored data.

The communication module is thus controlled to periodically perform time-limited network searches and to power down between searches, and this results in power saving advantages in comparison to the prior art.

Data that arrives at the data communication device during intervals between network searches is accumulated in the memory along with any previously-received data. The content of the memory is then ready to be communicated at the time of the next successful network connection. In this way, rather than being at risk of loss, relevant data such as data concerning the atmospheric conditions inside of the container during the course of a voyage is transmitted to a remote server during or around the end of the voyage.

Preferably, the invention utilises a sleep mode implemented separately and externally to the powered communication module. This is implemented by way of a timer (such as a watchdog timer or pulse counter) configured to transition said processor from a sleep mode into an active mode at regular intervals. Any sleep mode that may be pre-programmed into the communication module is effectively bypassed, with communication module control carried out by a separate processor.

Preferably the processor is coupled to a second power source, and this is preferably independent of the first power source.

In this way, an external, separately powered, processor operating as a discrete unit is used to manage the power to and the operation of the communication module.

Network searches are conducted for a specified time period (optimally in the order of between one minute and 5 minutes, preferably around two minutes) selected as sufficient to enable location and registration on a network, if such a network is available.

If the communication module camps on the network safely within this timeframe, a network connection is established. Otherwise, the processor instructs the communication module to terminate the network search, whereupon the communication module is powered off.

Optionally, the data communication device periodically tests the power level in said first power source after powering on the communication module and prior to attempting to establish a the network connection.

Typically, the length of the period between attempts to establish a network connection ('power-on cycle time') is in the range of one to ten hours, preferably in the order of six hours.

Typically, the network connection is a TCP connection with a remote Internet host. Other varieties of network connections, such as connections to hosts on a local LAN, can also be used.

Preferably, the data communication device includes a regulator for regulating the power supplied to the wireless module. According to preferred embodiments, the regulator includes a rechargeable power storage device configured to be charged by said first power source. The rechargeable power storage device preferably includes a capacitor or bank of capacitors.

In a preferred form, the rechargeable power storage device is configured to deliver an input voltage to the wireless module of between about 3.3 VCD and 4.5 VDC, with a dropout voltage of around 0.4 VDC. Preferably, the rechargeable power storage device is configured to deliver an input voltage to the wireless module of about 4.3 VCD with less than around 0.15 VDC droop.

Optionally, the communication module is configured to communicate data over the network in two or more bursts separated by a transmission interval, the duration of the bursts being substantially shorter than the duration of the transmission interval. For example, a typical burst duration is in the range of around 250-750 µs, preferably in the order of 567 µs, whereas a typical transmission interval is in the range of 2-8 ms, preferably in the order of 4.6 ms.

Typically, the length of time required to recharge the rechargeable power storage device is shorter than the transmission interval.

Generally, the communication module draws substantially higher current from the power source during a communication burst in comparison to other times when communication is not occurring. Typical current use during communication bursts is around 1.35 A, in comparison to 180 mA at other times.

In a preferred form, the processor is configured to enter a sleep mode in response to not receiving data for a specified time period.

Optimally, the processor is further configured to periodically:
transition from the sleep mode to an active mode; and
return to the sleep mode in the event that the power-on cycle time has not expired.

The sleep transition period may be in the range of 0.5 seconds to 5 seconds, preferably around 1 second.

Preferably, the processor is further configured to transition from the sleep mode to the active mode in response to the receipt of data at the port.

In this way, the processor, which is configured to manage the power to and the operation of the communication module, has its own sleep cycle, independent of the sleep cycle of the communication module. Although the processor consumes significantly less power than the communication module, additional power savings can be realised by having the processor periodically enter a sleep mode.

Optionally, the computer program includes computer-executable instructions for placing the processor, when in the active mode, into a selected operating state. The operating states may include any one or more of the following states as defined herein: STATE_WAKEUP, STATE_COLLECT_DATA, STATE_POWERUP_GPRS, STATE_REG_NETWORK, STATE_TX_DATA, STATE_TX_DISCONNECT, STATE_POWERDOWN_GPRS and STATE_EXIT.

Typically, the computer program includes computer-executable instructions for performing any one or more of the following functions:
placing the processor, after transitioning from the sleep mode to the active mode, into the STATE-WAKEUP state;
placing the processor into the STATE_COLLECT_DATA state in the event of the processor being transitioned to the active mode in response to the receipt of data at the port;
placing the processor into the STATE_POWERUP_GPRS state in the event that the power-on cycle time has expired;
placing the processor into the STATE_REG_NETWORK state after the elapse of a time period measured from when the processor entered the STATE_POWERUP_GPRS state;
placing the processor into the STATE_POWERDOWN_GPRS state in the event of a failure to establish a network connection;
placing the processor into the STATE_TX_DATA state in the event of a successful establishment of a network connection; and
placing the processor into the STATE_TX_DISCONNECT subsequent to data communication over the network; and
placing the processor into the STATE_EXIT when the processor is ready to return to sleep mode.

The memory preferably comprises one or more memory modules. In a preferred from, the memory includes first and second memories, the first memory having a greater write-efficiency than the second memory, wherein data arriving at the port is stored in the first memory and then moved from the first memory to the second memory only when the first memory is fully occupied. The first memory may be RAM. The second memory may be Flash memory.

The data communicated may be any data relating to conditions pertaining to a transportation container, including conditions monitored inside a controlled-environment transportation container. The data may include concentrations of gas components, pressure, temperature, timing of atmosphere monitoring, rate of gas supply and/or removal, valve and/or fan operation timing and durations, valve states, valve opening times and valve opening durations. In addition, further data may be communicated, such as the state of the first power source, or other information relating to operation and status of the communication module. Further, the data may include information relating to operation of the container refrigeration system and/or other equipment associated with the container.

According to a further aspect of the present invention there is provided a data communication method for recording and transmitting data concerning conditions pertaining to a transportation container, the method including:

with a processor, connected to a port for receiving said data and operatively connected to a communication module:
storing data received at said port;
periodically powering on the communication module by way of a communication module power source;
causing or permitting said communication module to attempt, for a specified time period, to establish a network connection;
in the event of a successful connection, causing or permitting said communication module to communicate stored data over the network; and
powering off the communication module.

The processor preferably has its own power source, independent of said communication module power source.

The periodic coupling of the communications module to the communication module power source is made in accordance with a power-on cycle time. Preferably, the method includes periodically switching the processor between a low power sleep mode and an active mode, and returning the processor to the sleep mode in the event that said power-on cycle time has not expired.

Preferably, the method includes switching the processor between a low power sleep mode and an active mode in response to receipt of data at said port, and returning the processor to the sleep mode after said data has been stored.

BRIEF DESCRIPTION OF THE DRAWINGS

A non-limiting embodiment of the present invention will now be described and illustrated by reference to the following drawings in which.

DETAILED DESCRIPTION OF THE DRAWINGS

Figure 1:
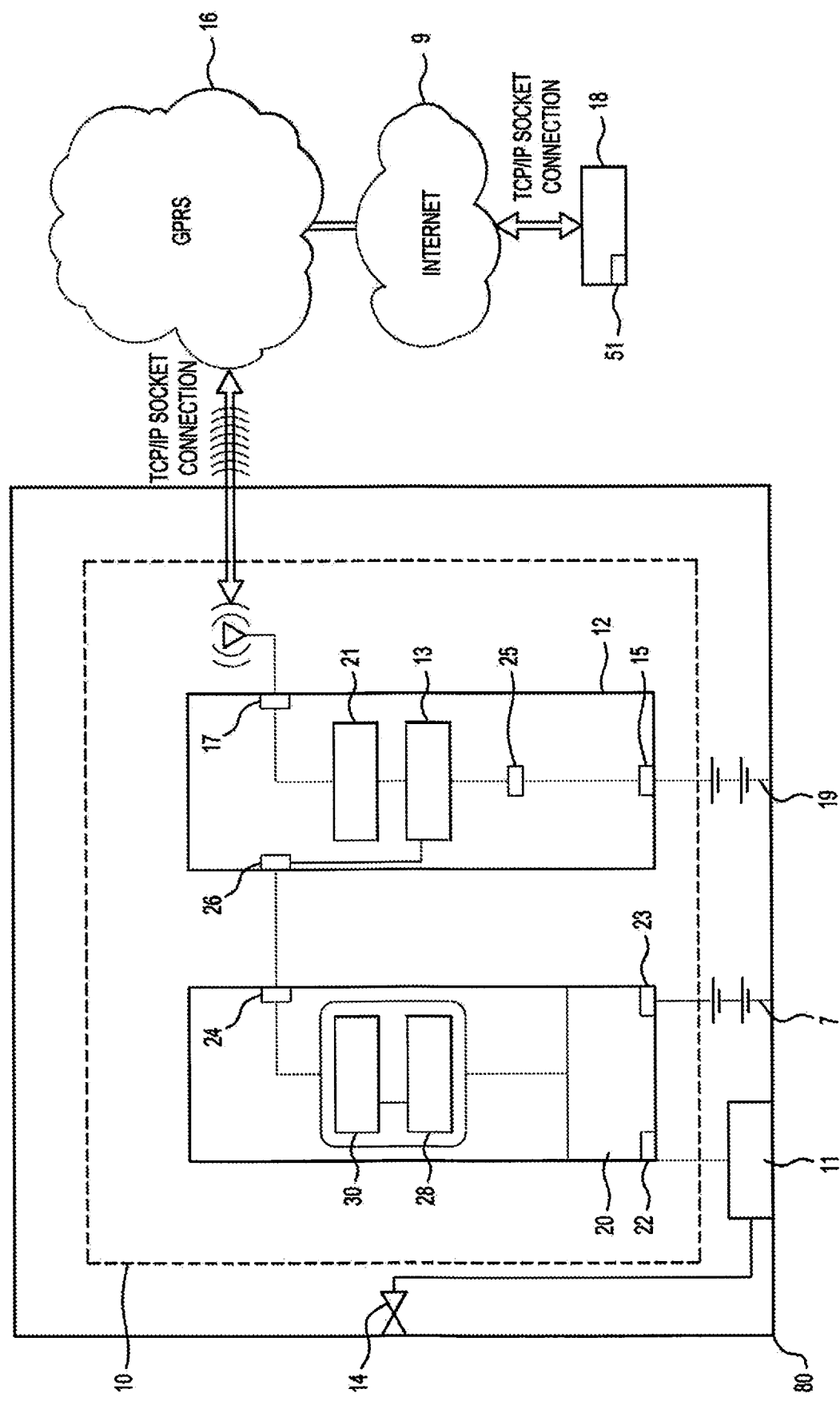
FIG. 1 is a schematic diagram of a data communication device in accordance with an embodiment of the present invention.

Turning to FIG. 1, a data communication device 10 is diagrammatically illustrated. Data communication device 10 is configured to record data concerning conditions pertaining to a transportation container 80. As discussed in the introductory paragraphs above, environment control is effected by way of a controller 11 (such as Mitsubishi Australia Limited's MAXtend™ controller) configured to sense atmospheric conditions inside container 80 and actuate one or more valves 14 in response thereto. Alternative functioning of controller 11 and valves 14 is described in the Applicant's Australian patent specifications nos. 764740 and 2012250500, incorporated herein by reference.

Communications device 10 includes a wireless module 12 (such as a Cinterion BGS2 module or similar) that includes a chipset 13, memory 21, and a modem/transceiver/antenna unit 17 for establishing GPRS data connections with wireless telecommunications network(s) 16. Other forms of wireless data networking may be applicable to the present invention including Zigbee, WIFI, Bluetooth, 3G and LTE. For example, the Cinterion EHS6 module, that includes a chipset and transceiver/antenna for establishing 3G data connections, is also suitable for use as a wireless module.

Wireless network 16 is in turn connected through the Internet 9 to a web server 18. Wireless module 12 further includes an input pin 15 for receiving DC power from a power source 19, via an interposed buffer capacitor circuit 25. Power source 19 is a pair of standard alkaline D cells. Wireless module 12 also includes a data transmission pin 26.

Data communication device 10 further includes a processor 20, such as a LTC 3539 Switched Mode Power Supply (SMPS) IC, although any other suitable processor (such as, for example, an ARM 32 MCS 8080) could also be used. Processor 20 includes an input pin 23 for receiving DC power from a power source 7, in the form of a lithium AA (or half AA) cell suppling power at 3.6 V. As described below, data communication device 10 is designed with power efficiency in mind, and as such is able to use low-cost standard alkaline and lithium batteries as power sources for both the processor 20 and wireless module 12.

It will be appreciated that data communication device 10 is an entirely standalone unit, ie. it does not require to draw power from controller 11 or from other power sources available in container 80 (such as a powered refrigeration unit).

Data communication device 10 includes Flash memory 28, RAM 30, and a data input pin 22 for receiving data concerning the atmospheric conditions inside container 80 from controller 11. Data communications device 10 also includes a data transmission pin 24 for outputting and receiving data to/from wireless module 12 via data transmission pin 26. Wireless module 12 typically receives data and control signals by way of AT commands.

Wireless module 12 has an operating range of input voltages of between 3.3 to 4.5 VDC, with a 0.4 VDC dropout voltage. Accordingly, processor 20 is configured to regulate the power supply to wireless module 12 to deliver 4.3 VDC with less than a 0.15 VDC droop.

The actual current usage of wireless module 12, when initialised for use in accordance with the invention, is bursts of 1.35 A lasting 567 microseconds, with an overall repetition period of 4.6 milliseconds. However, the average operating current of the module is as low as 180 mA.

Power regulation is effected by maintaining buffer capacitor circuit 25 at 4.3 VDC, so that power is available to wireless module 12 to effect data transmissions. In use, the power delivered from capacitor circuit 25 during transmission bursts (i.e the transmit current load) has a droop of less than 0.4 VDC.

Capacitor circuit 25 is recharged from power source 19 after the completion of a transmission burst. This ensures that power is available to wireless module 12 for the next transmission. The recharge time for capacitor circuit 25 (i.e the recovery time to the nominal output voltage) is necessarily shorter than the transmission burst repetition-period of wireless module 12.

Although the combined operation of processor 20 and capacitor circuit 25 does not regulate the power supply to wireless module 12 to a particularly high level of precision, it has been found to be more than adequate for the purposes of the present invention. At the same time, both the power source and power regulation circuitry are low cost components.

Figure 2:
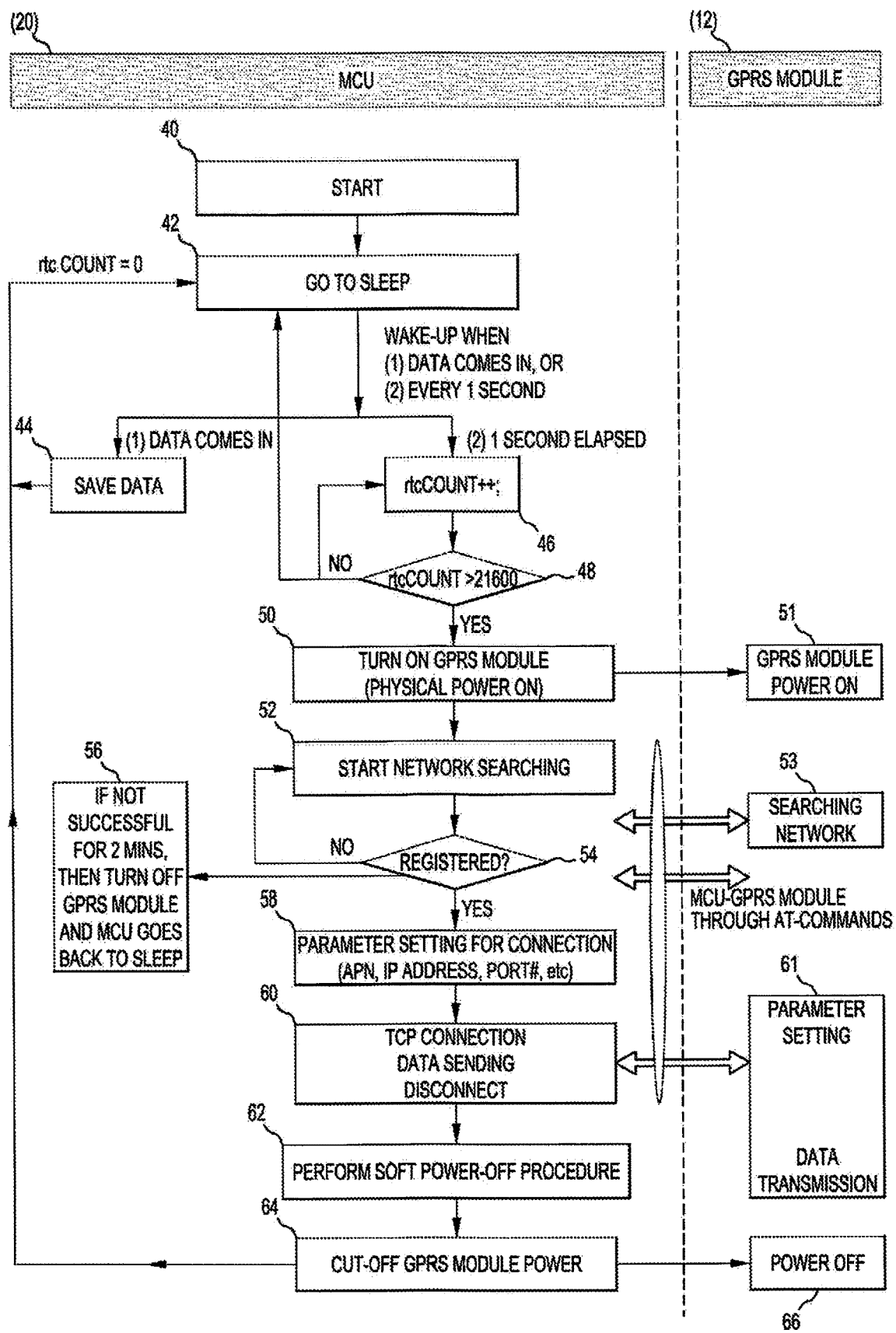
FIG. 2 is a flow chart illustrating the operating procedures of the data communication device illustrated in FIG. 1.

Operation of wireless module 12 and processor 20 will now be described by reference to the flow chart of FIG. 2. The operation procedure commences at step 40. At step 42 processor 20 (or MCU—Master Control Unit) is switched into a sleep mode, the characteristics of which are described below.

Any data arriving at input pin 22 (FIG. 1) from controller 11 causes processor 20 to transition from a sleep mode into an active mode (characteristics described further below). At step 44, the incoming data is stored on RAM 30 and/or Flash memory 28 in the manner described below. Processor 20 returns to the sleep mode after the data is stored.

In addition, upon the lapsing of a system-dependent time period (one second), processor 20 automatically transitions from sleep mode into active mode. Processor 20 is configured to perform this transition by utilising a pulse counter to monitor the output of the system clock (not shown). A one second time period has been found to be suitable in light of the data storage capacity of the pulse counter.

Once in the active mode, at step 46, a software-implemented counter (rtcCount) is incremented and a determination made (step 48) as to whether the counter's value is greater than a pre-determined timing parameter. The timing parameter governs the frequency with which wireless module 12 is powered on. In the embodiment described, the parameter is 21600, which equates to a power-on cycle of 6 hours. Other parameter values and associated time cycles can be used as required in view of factors such as the expected length of the particular voyage of container 80.

If the counter does not exceed the predetermined timing parameter, rtcCount is incremented and processor 20 returns to the sleep mode.

If the counter exceeds the timing parameter (ie. the prescribed power-on cycle time has elapsed), at step 50, processor 20 causes wireless module 12 to be powered on (step 51). The precise operating sequence of the power-on function is controlled by the programming of wireless module 12.

Next, operating software stored on RAM 30 and executing on processor 20 measures the power level of wireless module 12 by testing the voltage of battery 19 using AT command, AT^SBV. If 3.3<=Voltage<=4.5 (ie. the battery voltage is determined to be sufficient), wireless module 12 and processor 20 commence searching for an available network (steps 52 and 53).

In the event that the voltage is below the minimum value in the range (indicating that there is insufficient power available for wireless module 12 to effect a data transmission even if an available network is located), data transmission is not attempted and any data remains stored in Flash memory 28. This data can be retrieved (eg. by way of a conventional wired connection to a service logger) at a later time if required.

After the network search is commenced, a determination is made at step 54 as to whether the network search was successful. More particularly, if, after a prescribed time period, wireless module 12 is unable to locate an available network and complete registration thereon, processor 20 returns to the sleep mode (steps 56 and 42), rtcCounter is reset to zero, and wireless module 12 is powered off.

The prescribed network search time period is carefully selected in accordance with parameters such as network conditions, and in this embodiment is 120 s (two minutes). This period has been selected as appropriate to allow the decision to be made as to whether wireless module 12 is out of range of networks as typically occurs when container 80 is in the midst of an ocean voyage—with a view to the power consumption during network searches. Terminating a search prematurely risks module 12 failing to register with a network, even if one is available. Network registration may take longer when wireless module 12 is not in a home-network area, such as when container 80 approaches or arrives at a foreign port.

In the event of a successful network registration, network connection parameters (such as APN, IP address and Port number) are set on processor 20 (step 58). Next (step 60), a TCP connection is opened with remote server 18 and any data accumulated in Flash Memory is transmitted over the TCP connection to remote server 18. Any necessary parameter setting and data transmission commands for wireless module 12 are communicated to wireless module 12 from processor 20 by way of AT commands (step 61).

A socket communication server 51 (FIG. 1) executes on remote server 18 and provides the central server component that communicates with data communication device 10. Wireless module 12 establishes a TCP/IP socket connection with socket communication server 51. Of course any number of separate data communication devices 10 (such as those that are located in different containers on the same ship, or on respective containers on different ships) are capable of simultaneously establishing separate TCP/IP socket connections with socket communication server 51. Socket communication server 51 implements these simultaneous communications with multiple client units (i.e data communication devices) through the use of multiple threads. Socket communication server 51 creates a TCP socket and binds the application to the relevant port. It then listens to any incoming connections from the multiple units.

If, for example, multiple reefer units each equipped with an individual data communication device 10 are carried on a ship, as the ship approaches port and enters network range, each communication device will independently establish a TCP connection with communication server 18 in accordance with its programmed network search timing protocol, and transmit the contents of its memory to socket communication server 51. It will be understood that data transmissions may of course be made during a voyage, if the ship comes within range of a network in a territory close to the ship's course and if this occurrence coincides with a periodic network search.

In this way, a timeline record of the particular atmospheric conditions inside each container during the course of the voyage is transmitted to a remote server either during a voyage or after the voyage is complete. As described above, such data can be very valuable in applications such as operation monitoring and troubleshooting, controller calibration, statistical analysis, maintenance, etc.

After a successful data transmission, processor 20 performs a soft power-off procedure (step 62) that is described in greater detail below. The processor instructs wireless module 12 to power off (steps 64 and 66), causing it to cease operation.

Finally, processor 20 returns to sleep mode (steps 42) and rtcCount is reset to zero.

Figure 3:
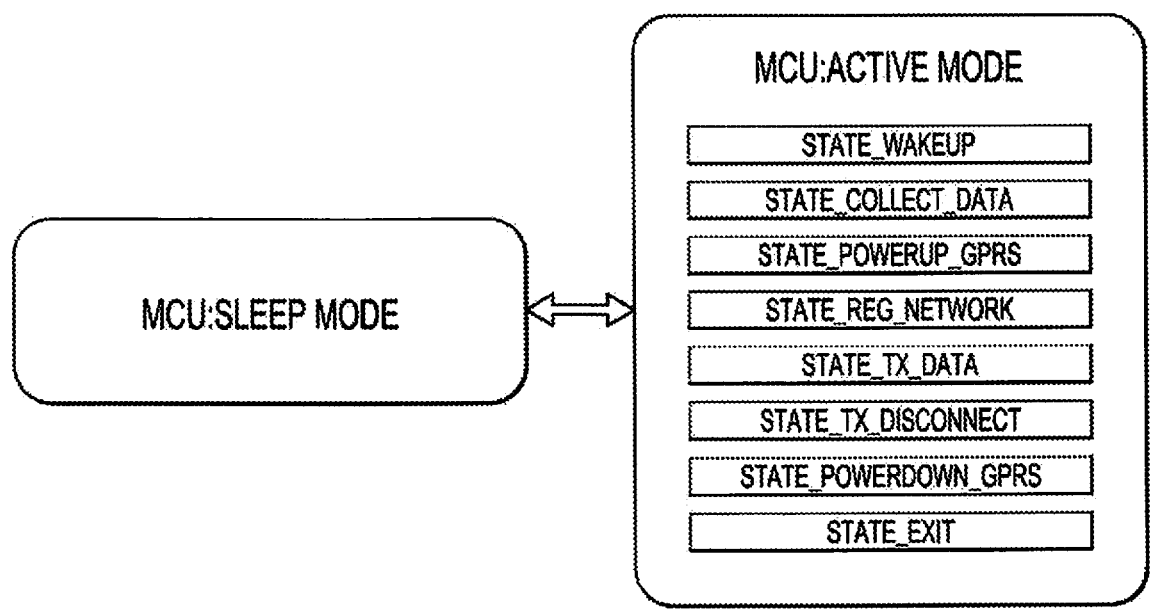
FIG. 3 is a diagram illustrating the hardware modes and software states of the processor component of the data communication device illustrated in FIGS. 1 and 2.

The various states of processor 20 are illustrated in the schematic diagram of FIG. 3. Processor 20 (MCU) can be in either of two modes: active or sleep. Active mode is the normal operating mode for processor 20 during which code is executed. Around 12 mA of current flows in processor 20 when in active mode.

Alternatively, during sleep mode the bus and system clocks (not shown) are halted. When in this mode, significantly less current (in the order of 4 microamps) flows in processor 20 and consequently significantly less power is consumed.

As discussed above, processor 20 is woken (i.e transitioned from sleep to active mode) either by the pulse counter or in response to the receipt of data at either input pin 22 or data transmission pin 24.

In accordance with its programming, processor 20 occupies one of eight software states when in the active mode. The operating procedure of processor 20 (described above and illustrated in FIG. 2) is directed by the current state and the values of system variables. The eight software states are as follows.

STATE_WAKEUP is the initial state occupied by processor 20 when first transitioned into active mode. In this state, processor 20 determines what is the correct next state to occupy according to the current value of system variables (such as rtcCount).

STATE_COLLECT_DATA is a state in which processor 20 collects data from input pin 22 and stores same in memory 28 or 30.

STATE_POWERUP_GPRS is a state in which processor 20 switches on wireless module 12 (i.e processor 20 physically switches on power to wireless module 12).

STATE_REG_NETWORK is a state in which processor 20 attempts to register to network 16. STATE_REG_NETWORK can be contrasted with STATE_POWERUP_GPRS, in that when processor 20 is in the latter state, it does not attempt to obtain a signal nor register to a network. Because wireless module 12 requires time until it is ready to register to a network, the STATE_REG_NETWORK state is indicative of wireless module 12 being ready to search for and obtain registration on a network.

STATE_TX_DATA is a state indicative of processor 20 camping successfully on a network while in STATE_REG_NETWORK. The state of processor 20 is set to STATE_TX_DATA upon achieving successful network camping. In this state, processor 20 can transmit data via wireless module 12. After completion of data transmission, the state of processor 20 is transitioned to STATE_TX_DISCONNECT.

STATE_TX_DISCONNECT is a state in which processor 20 disconnects the TCP connection with web server 18. In this regard, the TCP connection is disconnected by processor 20 sending an appropriate disconnection request to remote server 20.

STATE_POWERDOWN_GPRS is a state in which processor 20 turns off wireless module 12.

STATE_EXIT is a state indicative of processor 20 being ready to return to sleep mode.

Figure 4:
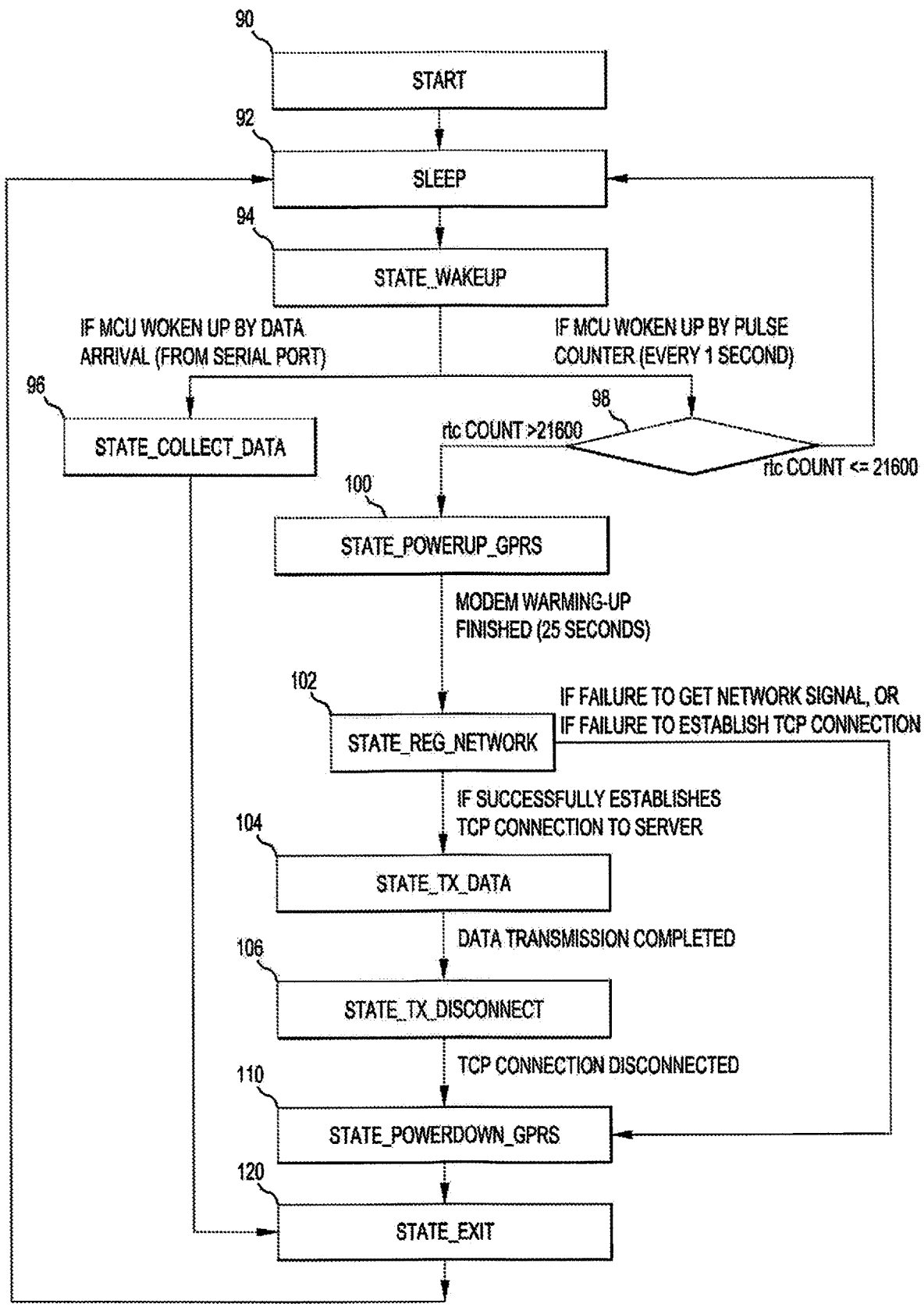
FIG. 4 is a flow chart illustrating the transitions between the states illustrated in FIG. 3.

The transition between the various states is further described by reference to the schematic flow chart of FIG. 4. At step 92 processor 20 (MCU) is in sleep mode. Processor 20 transitions from sleep mode into the STATE_WAKEUP state 94 either through the action of the pulse counter or due to receipt of data at input pin 22 or data transmission pin 24, as described above with reference to FIG. 1.

In the case of a mode transition due to receipt of data, as discussed above, processor 20 is transitioned to STATE_COLLECT_DATA state 96, whereupon data is collected from the relevant input and stored in memory 28 or 30. Processor 20 is then transitioned to STATE_EXIT state 120.

In the case of a state transition due to the action of the pulse counter, process control shifts to step 98 at which a determination is made as to whether system variable rtcCount has reached the predetermined timing parameter. In the described embodiment, the value of the timing parameter is 21600, which equates to a period of 6 hours. If rtcCount is less than or equal to 21600 the process returns to step 92 at which rtcCount is incremented and processor 20 transitioned back into SLEEP mode.

Alternatively, an rtcCount greater than 21600 indicates that a period of 6 hours has since the last attempt to establish a network connection. In this event, processor 20 is shifted into STATE_POWERUP_GPRS state 100, in which wireless module 12 is powered on. After wireless module's modem/transceiver/antenna unit 17 is initiated (this 'warming up' may take up to around 25 seconds), processor 20 is shifted into STATE_REG_NETWORK state 102 and commences the search for an available network.

In the case of a failure to either detect a suitable signal or establish a TCP connection, processor 20 is shifted into STATE_POWERDOWN_GPRS state 110, rtcCount is reset to zero, and wireless module 12 is powered down.

In the event of a successful establishment of a TCP connection with web server 18, processor 20 is transitioned into STATE_TX_DATA state 104 whereupon data transmission is performed. rtcCount is reset to zero. Following completion of data transmission, processor 20 is shifted into STATE_TX_DISCONNECT and the TCP connection is disconnected.

Returning to FIG. 1, at will be understood Flash memory 28, while being easy and fast to read, consumes power even when processor 20 is operating in sleep mode. This limitation of Flash is addressed by the use of RAM 30. More particularly, RAM 30 is used in a similar way as cache memory in a PC architecture. When data arrives at input pin 22, it is initially accumulated in RAM 30, which in the device tested comprises two 256 byte blocks (512 bytes in total) in size. Only when RAM 30 is fully occupied is data transferred (in a single write operation) to Flash Memory 28. In this way, the number of Flash write operations is minimised leading to a resulting significant power saving.

As will also be appreciated, wireless module 12 has power requirements that would necessitate a relatively high current power supply if continuous operation was contemplated. However, one major ability of wireless module 12 (and especially the BGS2 module) is its ability to be initialised to minimise the number of transmit periods. In conjunction with the highly intermittent operation of wireless module 12, the present invention enables very significant power efficiency gains to be realised.

Such gains are achieved from the insight that the purpose of a data communication device receiving input from an atmosphere controller is not so much real-time data collection, but rather voyage-based data collection. Accordingly, data communication device 10 operates to accumulate data from atmosphere controller 11 and attempts to periodically transfer accumulated data to central data collection web server 18. During periods in which data communication device 10 is out of range of a reliable network, data is simply accumulated. In this way, the accumulated data is ready to be transferred to server 18 on the occasion of the next successful connection and registration with telecommunications network 16.

In the embodiment described, the transfer attempt period is 6 hours. Using this mode of data transfer, it is estimated that data communication device 10 will have a usable unit lifetime of up to 2 years—quite possibly longer—from a single battery pack comprising a pair of alkaline D cell and a lithium AA or half AA cell.

In addition, the component selection, the power control algorithm and the low-cost power sources enable data communication device 10 (including controller 11) to be considered as a semi-disposable unit.

It will be appreciated that FIG. 1 is diagrammatic, and data communication device 10 may be integrated (either wholly or in part) into controller 11.

Figure 5:
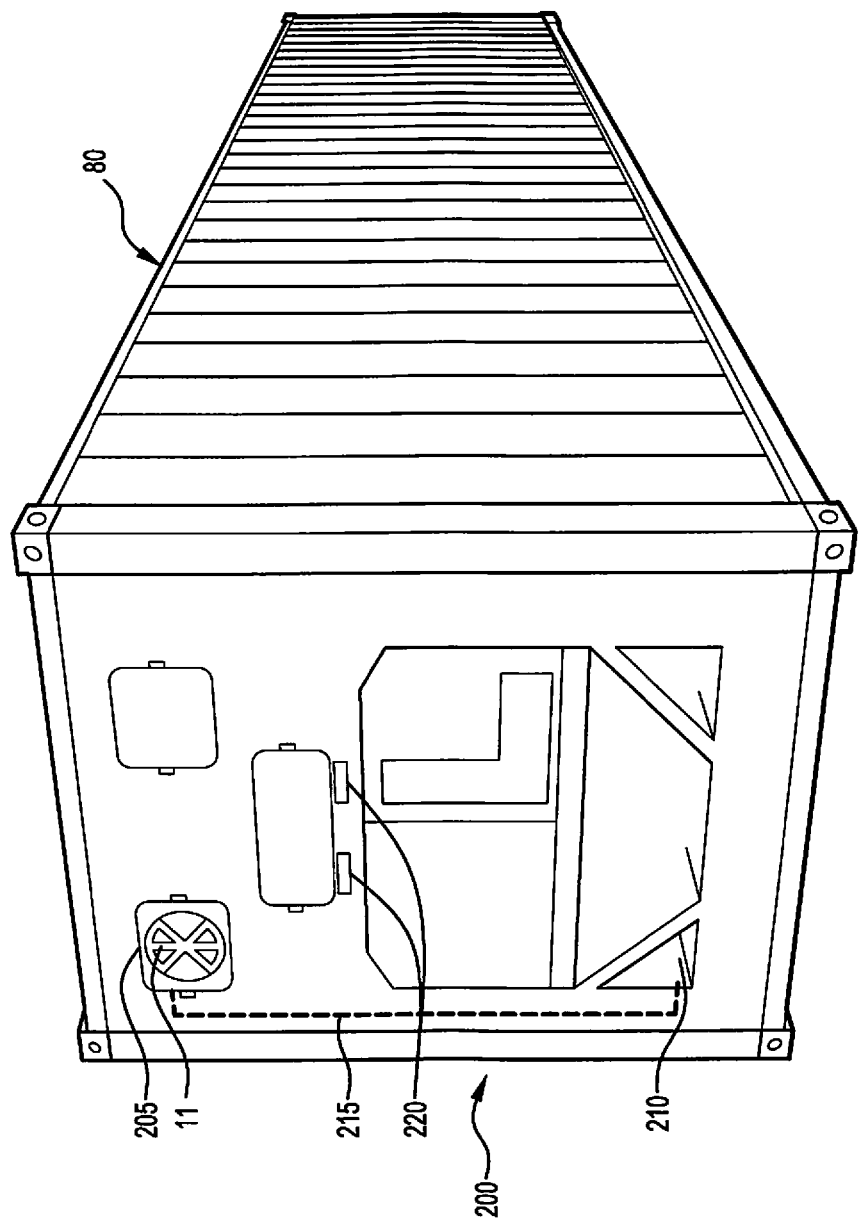
FIG. 5 shows a refrigerated shipping container in which the data communication device of the invention has been installed.

In an embodiment developed and tested by the applicant (see FIG. 5), the data communication device was provided as a discrete module in a rectangular housing of dimensions approximately 220 mm×110 mm×50 mm, with a weight of around 0.3 kg. Shipping container 80 with refrigeration unit 200 is fitted with MAXtend controller unit 11, installed into access hatch 205 for communication with the interior of the container. The data communication device 10 is installed into a suitable cable recess 210, and the required electrical cabling 215 provides the connection between controller 11 and port 22 of device 10.

In a further modification, data communication device 10 can be miniaturised to have dimensions suitable to fit into one of the fork pockets 220. These fork pockets 220 are provided for lifting refrigeration unit 200 into place in the end of container 80 by way of the tines of a forklift or similar, and are generally not used after the refrigeration unit is in place.

The word 'comprising' and forms of the word such as 'comprising', as used in this description, do not limit the invention claimed to exclude any variants or additions.

Modifications and improvements to the invention will be readily apparent to those skilled in the art. Such modifications and improvements are intended to be within the scope of this invention.

The invention claimed is:

1. A data communication device for recording and transmitting data concerning conditions pertaining to a transportation container, the communication device including:
   a processor having a sleep mode and an active mode;
   a memory;
   a port for receiving said data;
   a first power source;
   a communication module having a communication module power line for receiving power from the first power source;
   and a computer program stored in the memory, the program being operative, when executed on the processor to:
   transition the processor from the sleep mode into the active mode in response to the receipt of data at the port;
   store the received data in the memory;
   and cause the communication module to periodically:
   power on;
   attempt for a specified time period to establish a connection to a network node, and in the event of a successful connection, communicate data stored in the memory to the network;
   and power off,
   wherein the processor is further configured to periodically transition from the sleep mode to an active mode and return to the sleep mode in the event that a power-on-cycle time has not expired, the power-on cycle time being the period between attempts to establish a connection to the network node,
   and wherein the processor includes a processor power input line for receiving power from a second power source that is separate from the first power source.

2. A data communication device according to claim 1, wherein the data communication device is configured to periodically test the power level in said first power source after powering on the communication module and prior to attempting to establish a connection to the network node.

3. A data communication device according to claim 1, wherein the power-on cycle time is in the range of one to ten hours.

4. A data communication device according to claim 3, wherein the power-on cycle time is six hours.

5. A data communication device according to claim 1, further including a regulator for regulating the power supplied to the wireless module.

6. A data communication device according to claim 5, wherein the regulator includes a rechargeable power storage device configured to be charged by said first power source.

7. A data communication device according to claim 6, wherein the rechargeable power storage device includes a capacitor or bank of capacitors.

8. A data communication device according to claim 6, wherein the rechargeable power storage device is configured to deliver an input voltage to the wireless module of between 3.3 VCD and 4.5 VDC, with a dropout voltage of 0.4 VDC.

9. A data communication device according to claim 8, wherein the rechargeable power storage device is configured to deliver an input voltage to the wireless module of 4.3 VCD with less than 0.15 VDC droop.

10. A data communication module according to claim 6, wherein the communication module is configured to communicate data to the network node in two or more bursts separated by a transmission interval, the duration of the bursts being shorter than the duration of the transmission interval.

11. A data communication module according to claim 10, wherein the burst duration is in the range of 250-750 microseconds and the transmission interval is in the range of 2-8 milliseconds.

12. A data communication module according to claim 11, wherein the burst duration is 567 microseconds and the transmission interval is 4.6 milliseconds.

13. A data communication device according to claim 10, wherein the length of time required to recharge the rechargeable power storage device is shorter than the transmission interval.

14. A data communication device according to claim 1, wherein the processor is configured to enter a sleep mode in response to not receiving data for a specified time period, being a sleep transition period.

15. A data communication device according to claim 14, wherein the sleep transition period is in the range of 0.5 seconds to 5 seconds, preferably 1 second.

16. A data communication device according to claim 1, wherein the computer program further includes computer-executable instructions for placing the processor, when in the active mode, into a selected operating state.

17. A data communication device according to claim 16, wherein the operating states include any one or more of the following states as defined herein:

STATE_WAKEUP, STATE_COLLECT_DATA, STATE_POWERUP_GPRS, STATE_REG_NETWORK, STATE_TX_DATA, STATE_TX_DISCONNECT, STATE POWERDOWN_GPRS and STATE_EXIT.

18. A data communication device according to claim 17, wherein the computer program includes computer-executable instructions for performing any one or more of the following functions:

placing the processor, after transitioning from the sleep mode to the active mode, into the STATE_WAKEUP state;

placing the processor into the STATE_COLLECT_DATA state in the event of the processor being transitioned to the active mode in response to the receipt of data at the port;

placing the processor into the STATE_POWERUP_GPRS state in the event that the power-on cycle time has expired;

placing the processor into the STATE_REG_NETWORK state after the elapse of a time period measured from when the processor entered the STATE_POWERUP_GPRS state;

placing the processor into the STATE_POWERDOWN_GPRS state in the event of a failure to establish a network connection;

placing the processor into the STATE_TX_DATA state in the event of a successful establishment of a network connection;

placing the processor into the STATE_TX_DISCONNECT subsequent to data communication over the network; and placing the processor into the STATE_EXIT when the processor is ready to return to sleep mode.

19. A data communication device according to claim 1, wherein the memory comprises one or more memory modules.

20. A data communication device according to claim 19, wherein the memory includes first and second memories, the first memory having a greater write-efficiency than the second memory, wherein data arriving at the port is stored in the first memory and then moved from the first memory to the second memory only when the first memory is fully occupied.

21. A data communication device according to claim 1, wherein the conditions are monitored inside a controlled-environment transportation container.

22. A data communication method for recording and transmitting data concerning conditions pertaining to a transportation container, the method including;

with a processor having a processor power line, a low power sleep mode and an active mode, said processor connected to a port for receiving said data and operatively connected to a communication module, the communication module having a communication module input power line that is separate from the processor power line:

transitioning the processor from the low power sleep mode into the active mode in response to receipt of data at the port;

storing data received at said port;

periodically coupling, via the communication module power input line and in accordance with a power-on cycle time, the communication module to a communication module power source to power the communication module;

causing or permitting said communication module to attempt, for a specified time period, to establish a connection to a network node;

in the event of a successful connection, causing or permitting said communication module to communicate stored data over the network;

powering off the communication module; and returning the processor to the low power sleep mode, the method further including:

powering the processor via the processor power source line from a processor power source that is separate from the communication module power source, and periodically switching the processor between the low power sleep mode and the active mode, and returning the processor to the sleep mode in the event that the power-on cycle time has not expired.

* * * * *

UNITED STATES PATENT AND TRADEMARK OFFICE
CERTIFICATE OF CORRECTION

| | | |
|---|---|---|
| PATENT NO. | : 10,820,275 B2 | Page 1 of 1 |
| APPLICATION NO. | : 16/125997 | |
| DATED | : October 27, 2020 | |
| INVENTOR(S) | : Jones et al. | |

It is certified that error appears in the above-identified patent and that said Letters Patent is hereby corrected as shown below:

On the Title Page

Item (73) should be corrected to read:
Avcatech Laboratories Pty Ltd

Signed and Sealed this
Second Day of August, 2022

*Katherine Kelly Vidal*

Katherine Kelly Vidal
*Director of the United States Patent and Trademark Office*